US008625039B2

(12) United States Patent
Tajiri et al.

(10) Patent No.: US 8,625,039 B2

(45) Date of Patent: Jan. 7, 2014

(54) LIQUID CRYSTAL DISPLAY DEVICE

(75) Inventors: Kenichi Tajiri, Nagano (JP); Yutaka Kobashi, Nagano (JP); Hiroshi Kiya, Nagano (JP); Nobuhiko Yokoo, Nagano (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 683 days.

(21) Appl. No.: 12/884,758

(22) Filed: Sep. 17, 2010

(65) Prior Publication Data

US 2011/0075063 A1 Mar. 31, 2011

(30) Foreign Application Priority Data

Sep. 28, 2009 (JP) ................................ P2009-222095

(51) Int. Cl.

*G02F 1/136* (2006.01)
*G06F 3/038* (2013.01)
*G09G 5/00* (2006.01)

(52) U.S. Cl.

USPC .............................. 349/42; 345/211; 345/214

(58) Field of Classification Search

CPC ..... G09G 2330/00–2330/02; G09G 2330/027; G09G 2330/04; G09G 2320/0247

USPC .................................... 349/42; 345/211–213

See application file for complete search history.

(56) References Cited

U.S. PATENT DOCUMENTS

| | | | | |
|---|---|---|---|---|
| 6,639,590 | B2 * | 10/2003 | Takahashi et al. | 345/211 |
| 6,741,239 | B2 * | 5/2004 | Iwasaki | 345/211 |
| 6,812,911 | B2 * | 11/2004 | Makishima et al. | 345/92 |
| 6,903,734 | B2 * | 6/2005 | Eu | 345/211 |
| 7,271,801 | B2 * | 9/2007 | Toyozawa et al. | 345/211 |

FOREIGN PATENT DOCUMENTS

| | | |
|---|---|---|
| JP | 04-058219 | 2/1992 |
| JP | 05-100627 | 4/1993 |
| JP | 2002-169522 | 6/2002 |
| JP | 3884229 | 11/2006 |
| JP | 2011-033853 | 2/2011 |

* cited by examiner

*Primary Examiner* — Dwayne Bost
*Assistant Examiner* — Ivelisse Martinez Quiles
(74) *Attorney, Agent, or Firm* — K&L Gates LLP

(57) ABSTRACT

Disclosed herein is a liquid crystal display device having first and second substrates disposed to face each other so as to hold a liquid crystal layer therebetween, and a gate potential creating circuit for outputting a selection potential and a non-selection potential, scanning lines, signal lines, thin film transistors formed so as to correspond to intersection portions between the scanning lines and the signal lines, respectively, pixel electrodes electrically connected to the thin film transistors, respectively, and a gate control circuit for switching the selection potential and the non-selection potential supplied from the gate potential creating circuit over to each other, thereby supplying one of the selection potential and the non-selection potential to corresponding ones of the thin film transistors through corresponding one of the scanning lines being formed on the first substrate, and a common electrode being formed either on the first substrate or the second substrate.

14 Claims, 6 Drawing Sheets

LIQUID CRYSTAL DISPLAY DEVICE

CROSS-REFERENCES TO RELATED APPLICATIONS

The present application claims priority to Japanese Priority Patent Application JP 2009-222095 filed in the Japan Patent Office on Sep. 28, 2009, the entire content of which is hereby incorporated by reference.

BACKGROUND

The present invention relates to a liquid crystal display device, and more particularly to a liquid crystal display device which is used in a mobile device or the like and in which even when an abrupt power source cut-off state such as battery coming-off is caused, the electric charges remaining in a pixel electrode can be reliably discharged, and thus a burn-in phenomenon and a flicker in a phase of redriving are each hardly caused.

Since a liquid crystal device has the features such as light weight, thinness and low power consumption as compared with the case of a Cathode Ray Tube (CRT), the liquid crystal display device is used as a display device in many electronic apparatuses. A method utilizing a longitudinal electric field system, and a method utilizing a transverse electric field system are known as a method of applying an electric field across a liquid crystal layer of the liquid crystal display device. The liquid crystal display device utilizing the longitudinal electric field system is such that electrodes are respectively provided on paired transparent substrates disposed so as to sandwich the liquid crystal layer between them, and an electric field oriented approximately in a column direction is applied to liquid crystal molecules through the pair of electrodes. A liquid crystal display device having a Twisted Nematic (TN) mode, a liquid crystal display device having a Vertical Alignment (VA) mode, a liquid crystal display device having a Multi-domain Vertical Alignment (MVA) mode, and the like are known as the liquid crystal display device utilizing the longitudinal electric field system.

On the other hand, the liquid crystal display device utilizing the transverse electric field is such that a pair of electrodes is provided in an insulated style only on an inner surface side of one of paired substrates disposed so as to sandwich a liquid crystal layer between them and an electric field oriented approximately in the transverse direction is applied to the liquid crystal molecules. A liquid crystal display device having an In-Plane Switching (IPS) mode in which paired electrodes do not overlap each other in terms of planar view, and a liquid crystal display device having a Fringe Field Switching (FFS) mode in which paired electrodes overlap each other in terms of planar view are known as the liquid crystal display device utilizing the transverse electric field system.

In any of those liquid crystal display devices, pixel electrodes and a common electrode for formation of an electric field for changing an orientation of liquid crystal molecules, and scanning lines and signal lines for changing a voltage of the pixel electrode every pixel are formed in a display area of an array substrate. In this case, the pixels are disposed in a matrix. Predetermined signals are applied from driving ICs to the scanning lines and the signal lines, thereby displaying a predetermined image.

On the other hand, although the portable liquid crystal display device is used in a combination of a battery as a drive power source, the battery is come off in some sort of trigger (hereinafter referred to as "battery coming-off") in some cases. At this time, when the liquid crystal display device is in a driven state and thus the electric field is applied to the liquid crystal, a driving IC becomes a power source cut-off state in an instant. Therefore, the electric charges remain between the pixel electrodes and the common electrode, and thus the electric field is held applied to the liquid crystal. As a result, a burn-in phenomenon is caused. The normal liquid crystal display device is configured in such a way that a potential of the common electrode becomes the ground level as soon as the driving IC becomes the power source cut-off state. As will be described later, however, the normal liquid crystal display device is configured in such a way that the electric charges in the pixel electrode are hardly discharged. As a result, a potential difference is generated between the common electrode and the pixel electrode, and thus the electric field is held applied to the liquid crystal. In addition, when the power source is normally connected again after the electric field has been held applied to the liquid crystal in such a manner, a display failure such as a flicker is caused. Such a phenomenon remarkably appears especially in the case of the liquid crystal display device utilizing the transverse electric field system and having the FFS mode or the like.

In the portable liquid crystal display device, the discharge of the electric charges when the battery coming-off has been caused depends on OFF-leakage characteristics ($I_{DS}$ characteristics) of a Thin Film Transistor (TFT) for driving the pixel electrode when none of the measures is taken to cope with the battery coming-off. However, in the case of a Low Temperature Polycrystalline Silicon (LTPS)-TFT, the electric charges charged in the pixel electrode are not substantially caused because the leakage current is almost zero.

For example, an example of electrical characteristics of a general N-channel LTPS-TFT is shown in FIG. 9. It is noted that FIG. 9 shows a gate-to-source voltage Vg and a value of a current Ids caused to flow between a drain electrode and a source electrode when a drain voltage Vd=+10 V, and the drain voltage Vd=+0.1 V. The LTPS-TFT has a cut-off area in which no current is substantially caused to flow when the gate-to-source voltage Vg is equal to or smaller than a threshold voltage Vth, a rise area in which when the gate-to-source voltage Vg is equal to or larger than the threshold voltage Vth, Ids abruptly increases with an increase in gate-to-source voltage Vg, and a saturated area in which even the gate-to-source voltage Vg increases, the value of the current Ids becomes approximately constant.

As can be seen from the graph of FIG. 9, in the case of the gate-to-source voltage is 0 V in the general N-channel LTPS-TFT, even when the potential at the source electrode is 0 V, in any of the case of the drain voltage Vd=+10 V and the case of the drain voltage Vd=+0.1 V, the value of the current Ids is equal to or smaller than $10^{-12}$ A, and thus a very small leakage current is merely caused to flow. For this reason, in particular, in the liquid crystal display device having the Fringe Field Switching (FFS) mode and using the LTPS-TFT as the TFT for driving the pixel electrode, since the burn-in phenomenon becomes easy to cause, some sort of measures needs to be taken in the phase of the abrupt power source cut-off state or the like.

With regard to the measures taken to cope with those problems, it is expected that the battery coming-off is detected, and thus a display-OFF sequence is driven and so forth. However, since the battery coming-off is caused in an instant, it is difficult to sufficiently actuate the display-OFF sequence. Then, in the liquid crystal display device disclosed in Japanese Patent No. 3884229 (hereinafter referred to as Patent Document 1), attention is paid to the fact that the $I_{DS}$ characteristics of the TFT for driving the pixel electrode depends on the $V_{GS}$ potential. That is to say, the $V_{GS}$ potential in the phase of the battery coming-off is increased, thereby speedily discharging the electric charges in the pixel electrode. Here, a circuit for increasing the potential $V_{GS}$ of the liquid crystal display device disclosed in Patent Document 1 will now be described with reference to FIGS. 10 and 11.

Note that, FIG. 10 is a circuit diagram of a gate-OFF voltage control circuit of the liquid crystal display device disclosed in Patent Document 1. FIG. 11 is a graphical representation showing changes in voltages in the gate-OFF voltage control circuit. The gate-OFF voltage control circuit switches a voltage VL applied to a scanning line from a normal potential over to a potential for leakage by using three potentials of a potential (20 V) at a terminal VH corresponding to a gate-ON voltage in the normal state, a potential (7 V) at a terminal VCOM, and a potential (−12 V) at a terminal VEE when the power supply from a power source of the liquid crystal display device is stopped, so that an absolute value of a power source voltage begins to stop.

In the normal operation, at and before a voltage supply cut-off time T1, a potential at a terminal VL is supplied as a potential which is a given voltage larger than VEE by a diode TD1 provided between the terminal VEE and the terminal VL. In FIG. 10, since a 9 V-product is used as the diode TD1, a voltage which is 9 V larger than the potential at the terminal VEE is supplied to the terminal VL. During this state, a transistor element TR1 interposed between the terminal VCOM and the terminal VEE is held in an OFF state.

Next, when the power supply is cut off at T1, as also shown in FIG. 11, the potential at the terminal VH begins to drop toward the GND potential. At this time, since a potential at a connection point P1 side of a capacitor C1 is also reduced so as to follow the drop of the potential at the terminal VH, a potential at the connection point P1 becomes the threshold voltage or more lower than that at a connection point P2. As a result, the transistor element TR1 becomes a conduction state, so that the connection point P2 and the connection point P3 are short-circuited. As a result, the voltage developed at the terminal VEE (at a connection point P3) and the voltage developed at the terminal VCOM (at the connection point P2) are cancelled each other to rapidly make toward the GND potential. This simultaneously means that a value of a voltage at a connection point P5 (=the potential at the connection point P3) rapidly increases from a minus potential toward the GND potential. For this reason, a potential at the terminal VL (at a connection point P4) (=a potential at a connection point P6) rapidly rises as shown in FIG. 11 due to the presence of the diode TD1.

Finally, when the potential at the connection point P5 reaches the GND potential at a time T2 as a time point at which the voltage VL is maximum, the potential at the connection point P4 also gets a maximum value. At and after the time point T2, the potential at the connection point P4, that is, the potential VL gradually drops toward the GND potential. At this time, a capacitor C2 is connected between the connection point P5 and the connection point P6. The reason for this is because a period of time from the time point T2 at which the potential VL reaches the maximum value to a time point at which the potential VL drops to the GND potential can be lengthened.

As shown in FIG. 11, the potential at the terminal VL shows inverse V letter-like characteristics in which at and after the time point T1, the potential at the terminal VL temporarily rises up to a potential between the potential at the terminal VL and the potential at the terminal VH in the phase of the operation, and soon reaches the GND potential. Therefore, it is possible to realize a configuration with which when the power supply from the power source is cut off, the potential at the terminal VL is supplied to the corresponding one(s) of the scanning lines, thereby leaking the electric charges in the pixel electrode.

SUMMARY

The gate-OFF voltage control circuit of the liquid crystal display device disclosed in Patent Document 1 operates based on the voltage drop after the power supply from the power source is cut off so as to form the potential for leakage different from that in the normal operating state. However, the potential for leakage is made based on the electric charges which either remain within the circuit or are accumulated in the circuit of the liquid crystal display device at a time point when the power supply from the power source is cut off. For this reason, since the gate-OFF voltage control circuit of the liquid crystal display device disclosed in Patent Document 1 can be completed in its configuration within the liquid crystal display device, the gate-OFF voltage control circuit has a large advantage that the liquid crystal display device disclosed in Patent Document 1 can be readily replaced with the existing liquid crystal display device.

However, the liquid crystal display device disclosed in Patent Document 1 uses the transistor element TR1 and also proposes the measures taken to cope with the larger voltage than the normal non-selection potential between the potential $V_{GS}$ and the lower potential than the potential $V_{GS}$ through the diode as the method of increasing the potential $V_{GS}$. Therefore, the configuration of the device becomes complicated. In addition thereto, since the charging/discharging of the electric charges to/from the capacitor C2 is carried out through the resistor R2, there is encountered such a problem that a period of time required to reach the predetermined potential for leakage becomes long in the phase of the cut-off of the power supply from the power source.

In order to solve the problems as described above, the inventors of this application have already found out that by short-circuit between a selection potential VDD and a non-selection potential VBB, the potential $V_{GS}$ can be increased for a short period of time when the battery coming-off or the like is caused, and as a result, the electric charges charged in the pixel electrode can be discharged for a short period of time. However, when a gate potential creating circuit composed of a CMOS circuit is formed within a driver circuit, the non-selection potential VBB becomes the lowest potential in a driver IC in many cases. Therefore, in general, a Schottky diode is inserted between the ground potential VSS and the non-selection potential VBB for the purpose of preventing latch up from being caused.

That is to say, in the CMOS circuit, a bipolar parasitic transistor circuit is configured inside the device in terms of the configuration, and has the same configuration as that of a thyristor. As a result, when the thyristor is triggered with a foreign surge or the like, the thyristor is turned ON, and thus an excessive current is continuously caused to flow. In order to prevent such latch up from being caused, the Schottky diode is inserted in the position between the ground potential VSS and the non-selection potential VBB. In this case, it has been found out that even when the selection potential VDD and the non-selection potential VBB are simply short-circuited in the case where the battery coming-off or the like is caused, the non-selection potential VBB does not become equal to or larger than a voltage VF (forward voltage) of the Schottky diode due to an influence of the Schottky diode.

The inventors of this application have variously carried out a series of studies in order that the non-selection potential VBB may reliably become equal to or larger than the ground potential VSS for a short period of time even when the selection potential VDD and the non-selection potential VBB are short-circuited in the manner as described above in the case where the battery coming-off or the like is caused. As a result, the inventors of this application have found out that a TFT is inserted into a supply side of the non-selection potential VBB, and when the battery coming-off or the like is caused, the supply of the non-selection potential VBB from a gate potential creating circuit is cut off so that the TFT becomes an OFF state, thereby making it possible to attain the desire described above. Thus, the inventors of this application reach completion of the present application.

The present invention has been made in order to solve the problems described above, and it is therefore desirable to provide a liquid crystal display device in which even when an abrupt power source cut-off state such as a battery coming-off is caused, a TFT for driving a pixel electrode is reliably turned ON in such a way that a non-selection potential VBB reliably becomes equal to or larger than a ground potential VSS for a short period of time, and thus a burn-in phenomenon and a flicker in a phase of re-driving are each hardly caused by perfectly discharging electric charges remaining in the pixel electrodes.

In order to attain the desire described above, according to an embodiment, there is provided a liquid crystal display device having a first substrate and a second substrate disposed to face each other so as to hold a liquid crystal layer between the first substrate and the second substrate, and a gate potential creating circuit for outputting a selection potential and a non-selection potential, scanning lines, signal lines, thin film transistors formed so as to correspond to intersection portions between the scanning lines and the signal lines, respectively, pixel electrodes electrically connected to the thin film transistors, respectively, and a gate control circuit for switching the selection potential and the non-selection potential supplied thereto from the gate potential creating circuit over to each other, thereby supplying one of the selection potential and the non-selection potential to corresponding ones of the thin film transistors through corresponding one of the scanning lines being formed on the first substrate; and a common electrode being formed either on the first substrate or the second substrate; wherein a voltage control circuit for changing the non-selection potential to a potential in a rise area of the thin film transistor in accordance with a power source cut-off signal is connected between the gate potential creating circuit and the gate control circuit;

the voltage control circuit includes a diode connected between a supply terminal for the non-selection potential of the gate potential creating circuit and a ground potential, a first switching element connected between the supply terminal for the non-selection potential of the gate potential creating circuit and an input terminal for the non-selection potential of the gate control circuit, and a short-circuit element connected between an input terminal for the selection potential and the input terminal for the non-selection potential of the gate control circuit;

the first switching element cuts off between the supply terminal for the non-selection potential of the gate potential creating circuit and the input terminal for the non-selection potential of the gate control circuit in accordance with the power source cut-off signal; and the short-circuit element substantially short-circuits between the input terminal for the selection potential and the input terminal for the non-selection potential of the gate control circuit in accordance with the power source cut-off signal.

In the liquid crystal display device according to the embodiment, the voltage control circuit includes the diode connected between the supply terminal for the non-selection potential of the gate potential creating circuit and the ground potential, the first switching element connected between the supply terminal for the non-selection potential of the gate potential creating circuit and the input terminal for the non-selection potential of the gate control circuit, and the short-circuit element connected between the input terminal for the selection potential and the input terminal for the non-selection potential of the gate control circuit. Also, the first switching element cuts off between the supply terminal for the non-selection potential of the gate potential creating circuit and the input terminal for the non-selection potential of the gate control circuit in accordance with the power source cut-off signal. The short-circuit element substantially short-circuits between the input terminal for the selection potential and the input terminal for the non-selection potential of the gate control circuit in accordance with the power source cut-off signal. By adopting the configuration described above, in the phase of the power source cut-off, the cut-off is made between the supply terminal for the non-selection potential of the gate potential creating circuit and the input terminal for the non-selection potential of the gate control circuit. In addition, the input terminal for the selection potential and the input terminal for the non-selection potential of the gate control circuit are substantially short-circuited.

For this reason, in the phase of the power source cut-off, the non-selection potential is not supplied from the gate potential creating circuit to the gate control circuit. In addition, the potential at the input terminal for the non-selection potential of the voltage control circuit substantially becomes the same potential as that supplied to the input terminal for the selection potential. Therefore, with the liquid crystal display device according to the embodiment, the non-selection potential can be reliably changed to the potential in the rise area of the thin film transistor. Thus, since even when the abrupt power source cut-off such as the battery coming-off is caused, the electric charges remaining in the pixel electrode are discharged for a short period of time, no potential difference is generated between the pixel electrode and the common electrode, and thus the burn-in phenomenon and the flicker after the restart become difficult to cause.

It is noted that the wording "substantially short-circuited" in the present invention does not necessarily mean that the short-circuit is carried out in such a way that the resistance value becomes "zero." Thus, the wording "substantially short-circuited" in the present invention means that all it takes is that even when the short-circuit element has a certain degree of resistance value, this case is regarded as being similar to the case where in the phase of the normal operation, the short-circuit element dose not equivalently exist, and thus this case is regarded as being similar to the case where when the power source cut-off is caused, the resistance value of the short-circuit element is equivalently "zero." In addition, the diode connected between the supply terminal for the non-selection potential of the gate potential creating circuit and the ground potential is provided in order to prevent the latch up of the gate potential creating circuit from being caused. Also, the rise area in the present embodiment represents an area in which when the gate-to-source voltage Vg of the thin film transistor is equal to or larger than the threshold voltage Vth, the gate-to-source voltage Vg and the value of the current Ids caused to flow between the drain electrode and the source electrode are abruptly increased. Moreover, the potential in the rise area in the present embodiment is used as the meaning which contains not only the potential in the rise area, but also the potential in the saturated area.

In addition, in the liquid crystal display device according to the embodiment, preferably, the power source cut-off signal is a signal which is held at an H level in a phase of a normal operation, and is held at an L level in a phase of a power source cut-off, and the first switching element is composed of an N-channel thin film transistor.

When the power source cut-off signal is the signal which is held at the H level in the phase of the normal operation, and is held at the L level in the phase of the power source cut-off, like the mobile device, even in the liquid crystal display device for battery drive, the power source cut-off signal is easy to generate as compared with the reversed case. In addition, in the liquid crystal display device according to the embodiment, since the first switching element is composed of the N-channel thin film transistor, the first switching element is reliably turned OFF for every short period of time in accordance with the power source cut-off signal. Therefore, the effects described above are satisfactorily offered.

In addition, in the liquid crystal display device according to the embodiment, preferably, stabilizing capacitors are connected between the supply terminal for the selection potential of the gate potential creating circuit and the ground potential, and between the supply terminal for the non-selection potential of the gate potential creating circuit and the ground potential, respectively.

When the abrupt power source cut-off such as the battery coming-off is caused, the gate potential creating circuit has a high impedance because the gate potential creating circuit is normally composed of a voltage boosting circuit such as a charge pump, and a voltage inverting circuit. As a result, the current output cannot be obtained from the gate potential creating circuit. However, in the liquid crystal display device according to the embodiment, the stabilizing capacitors are connected between the selection potential supply line extending from the gate potential creating circuit and the ground potential, and between the non-selection potential supply line extending from the gate potential creating circuit and the ground potential, respectively. Therefore, when the abrupt power source cut-off state such as the battery coming-off is caused, the electric charges charged in the stabilizing capacitor connected between the selection potential supply line extending from the gate potential creating circuit and the ground potential are directly supplied to the input terminal for the selection potential of the gate control circuit, and are also supplied to the input terminal for the non-selection potential of the gate control circuit through the short-circuit element. For this reason, in the liquid crystal display device according to the embodiment, even when the abrupt power source cut-off state such as the battery coming-off is caused, the output potential from the gate control circuit can be held in the potential falling in the rise area for some time. Thus, the electric charges remaining in the pixel electrode can be reliably discharged.

In addition, in the liquid crystal display device according to the embodiment, preferably, discharge resistors are connected in parallel with the stabilizing capacitors, respectively, and resistance values of the discharge resistors are identical to each other.

In the case where only the stabilizing capacitors are provided, when the abrupt power source cut-off state such as the battery coming-off is caused, the electric charges charged in the stabilizing capacitors are not discharged and remains as they are. As a result, in the phase of the restart, the selection potential and the non-selection potential become abnormal values, respectively, which exerts a bad influence on a quality of a displayed image. However, in the liquid crystal display device according to the embodiment, since the discharge resistors having the same resistance value are connected in parallel with the stabilizing capacitors, respectively, even when the abrupt power source cut-off state such as the battery coming-off is caused, the electric charges charged in the respective stabilizing capacitors are discharged through the respective discharge resistors. As a result, the selection potential and the non-selection potential are prevented from getting the abnormal values, respectively, in the phase of the restart, and thus the bad influence is prevented from being exerted on the quality of the displayed image.

In addition, in the liquid crystal display device according to the embodiment, preferably, a non-selection potential stabilizing capacitor is connected between the input terminal for the non-selection potential of the gate control circuit, and the ground potential.

In the liquid crystal display device according to the embodiment, the noises generated resulting from a state in which in the phase of the power source cut-off, the first switching element is turned OFF, and thus the non-selection potential is not supplied from the gate potential creating circuit to the gate control circuit can be absorbed by the non-selection potential stabilizing capacitor. For this reason, in the liquid crystal display device according to the embodiment, the electric charges remaining in the pixel electrode in the phase of the power source cut-off can be more reliably discharged.

In addition, in the liquid crystal display device according to the embodiment, preferably, a following relationship is established:

$$Cd \geq C1$$

where Cd is a capacitance value of the stabilizing capacitor connected to the supply terminal for the selection potential of the gate potential creating circuit, and C1 is a capacitance value of the non-selection potential stabilizing capacitor.

When the abrupt power source cut-off state such as the battery coming-off is caused, the electric charges charged in the stabilizing capacitor having the capacitance value Cd and connected to the supply terminal for the selection potential of the gate potential creating circuit are supplied to the input terminal for the non-selection potential of the gate control circuit through the short-circuit element. However, since those electric charges are used for the neutralization of the electric charges charged in the non-selection potential stabilizing capacitor having the capacitance value C1, and the further charging, the potential at the input terminal for the non-selection potential of the gate control circuit is considerably reduced as compared with the case of the selection potential. In the liquid crystal display device according to the embodiment, the capacitance value Cd of the stabilizing capacitor connected to the supply terminal for the selection potential of the gate potential creating circuit is set as being larger than the capacitance value C1 of the non-selection potential stabilizing capacitor (Cd≥C1). Therefore, even when the abrupt power source cut-off state such as the battery coming-off is caused, the potential at the input terminal for the non-selection potential of the gate control circuit can be sufficiently made the potential falling in the rise area of the thin film transistor. As a result, the electric charges remaining in the pixel electrode can be more reliably discharged. Note that, more preferably, the capacitance value Cd of the stabilizing capacitor connected to the supply terminal for the selection potential of the gate potential creating circuit, and the capacitance value C1 of the non-selection potential stabilizing capacitor meets the following relationship:

$Cd \geq 2C1$

In addition, in the liquid crystal display device according to the embodiment, preferably, the short-circuit element is composed of a resistor connected between the input terminal for the selection potential and the input terminal for the non-selection potential of the gate control circuit.

In the liquid crystal display device according to the embodiment, since the short-circuit element is composed of the resistor connected between the input terminal for the selection potential and the input terminal for the non-selection potential of the gate control circuit, the circuit configuration is very simple and is inexpensive. All it takes is that a resistance value of the resistor as the short-circuit element can be regarded as being similar to the case where the resistor does not equivalently exist in the phase of the normal operation, and can be regarded as being similar to the case where the resistance value is equivalently "zero" when the power source cut-off is caused.

In addition, in the liquid crystal display device according to the embodiment, preferably, a resistance value of the resistor is equal to or larger than 50 kΩ, and is equal to or smaller than 500 kΩ.

When the resistance value of the resistor connected between the input terminal for the selection potential and the input terminal for the non-selection potential of the gate control circuit is smaller than 50 kΩ, the power consumption of the gate potential creating circuit becomes too large. On the other hand, when the resistance value of the resistor exceeds 500 kΩ, it takes too much time until the voltage outputted from the gate control circuit is switched over to the potential falling in the rise area, and thus the voltages applied to the respective circuits are dissipated for this period of time. As a result, the electric charges remaining in the pixel electrode cannot be sufficiently discharged. This is not preferable.

In addition, in the liquid crystal display device according to the embodiment, preferably, the resistor is formed from the same film as that of a semiconductor layer of the thin film transistor.

In the liquid crystal display device according to the embodiment, since the resistor can be formed from the same film as that of the semiconductor layer of the thin film transistor, the resistor can be readily formed on the first substrate. Also, when the abrupt power source cut-off state such as the battery coming-off is caused, the electric charges remaining in the pixel electrode can be reliably discharged.

In addition, in the liquid crystal display device according to the embodiment, preferably, the short-circuit element is composed of a second switching element connected between the input terminal for the selection potential, and the input terminal for the non-selection potential of the gate control circuit, and the second switching element is adapted to be turned ON in accordance with the power source cut-off signal.

In the liquid crystal display device according to the embodiment, the voltage control circuit is composed of the second switching element connected between the input terminal for the selection potential, and the input terminal for the non-selection potential of the gate control circuit, and the second switching element is adapted to be turned ON in accordance with the power source cut-off signal. Therefore, the circuit configuration is very simple, and also the selection potential supply line and the non-selection potential supply line can be reliably short-circuited for a very short period of time.

In addition, in the liquid crystal display device according to the embodiment, preferably, the power source cut-off signal is a signal which is held at an H level in a phase of a normal operation, and is held at an L level in a phase of a power source cut-off, and the second switching element is composed of a P-channel thin film transistor.

When the power source cut-off signal is the signal which is held at the H level in the phase of the normal operation, and is held at the L level in the phase of the power source cut-off, like the mobile device, even in the liquid crystal display device for battery drive, the power source cut-off signal is easy to generate as compared with the inversed case. In addition, the P-channel TFT is turned ON when a gate potential becomes the L level, and is turned OFF when the gate potential becomes the H level. For this reason, since when the signal which becomes the L level in the phase of the power source cut-off is supplied to the gate electrode of the P-channel TFT, the P-channel TFT is turned ON, and thus the input terminal for the selection potential and the input terminal for the non-selection potential of the gate control circuit are short-circuited. In addition, since an ON-resistance of the P-channel TFT is small, and an operating speed thereof is high, the effects of the present application are satisfactorily offered.

In addition, in the liquid crystal display device according to the embodiment, preferably, a potential of an input signal from the gate control circuit has inverse V letter-like characteristics in which the potential of the input signal from the gate control circuit temporarily rises up to the potential falling in the rise area after generation of the power source cut-off signal, and then converges to the ground potential.

In the liquid crystal display device according to the embodiment, when the operation state becomes the power source cut-off state, finally, each of the potentials of the respective portions converges to the ground potential. Thus, in the liquid crystal display device according to the embodiment, even when the abrupt power source cut-off state such as the battery coming-off is caused, the electric charges remaining in the pixel electrode can be reliably discharged while the potential of the input signal from the gate control circuit temporarily rises up to the potential falling in the rise area. Note that, it is attained by connecting a voltage control circuit between the input terminal for the selection potential and the input terminal for the non-selection potential of the gate control circuit that the potential of the input signal from the gate control circuit has such inverse V letter-like characteristics in which the potential of the input signal from the gate control circuit temporarily rises up to the potential falling in the rise area after the power supply of the power source to the liquid crystal display device has been cut off, and then converges to the ground potential.

In addition, in the liquid crystal display device according to the embodiment, preferably, a period of time required for the potential of the input signal from the gate control circuit to reach the potential falling in the rise area is set as being equal to or shorter than one second.

In the liquid crystal device, it takes several seconds until each of the potentials of the portions converges to the ground potential after the power source cut-off state has been caused. In the liquid crystal display device according to the embodiment, however, the period of time required for the potential of the input signal from the gate control circuit to reach the potential falling in the rise area after the operation state has become the power source cut-off state is set as being equal to or shorter than one second. Therefore, even when the abrupt power source cut-off state such as the battery coming-off is caused, the electric charges remaining in the pixel electrode can be reliably discharged.

In addition, in the liquid crystal display device according to the embodiment, preferably, each of the gate potential creating circuit and the gate control circuit is formed in an outer peripheral portion of a display area of the first substrate, and a semiconductor layer includes a transistor made of polysilicon.

When the gate potential creating circuit and the gate control circuit are formed in portions each different from the first substrate and the second substrate, respectively, a flexible printed wiring board needs to be connected between the gate potential creating circuit and the gate control circuit, and either the first substrate or the second substrate. In this case, however, it may be impossible to shorten the period of time required for the potential of the output from the gate control circuit to reach the potential falling in the rise area due to a signal delay in the flexible printed wiring board. In the liquid crystal display device according to the embodiment, however, since each of the gate potential creating circuit and the gate control circuit is formed in the outer peripheral portion of the first substrate, it is possible to shorten the period of time required for the potential of the output signal from the gate control circuit to reach the potential falling in the rise area. Therefore, the effects described above can be effectively offered. In addition, since the semiconductor layer includes the transistor made of polysilicon, the semiconductor layer can be formed in the same process as that for the thin film transistor connected to the pixel electrode.

Additional features and advantages are described herein, and will be apparent from the following Detailed Description and the figures.

DETAILED DESCRIPTION

Figure 1:
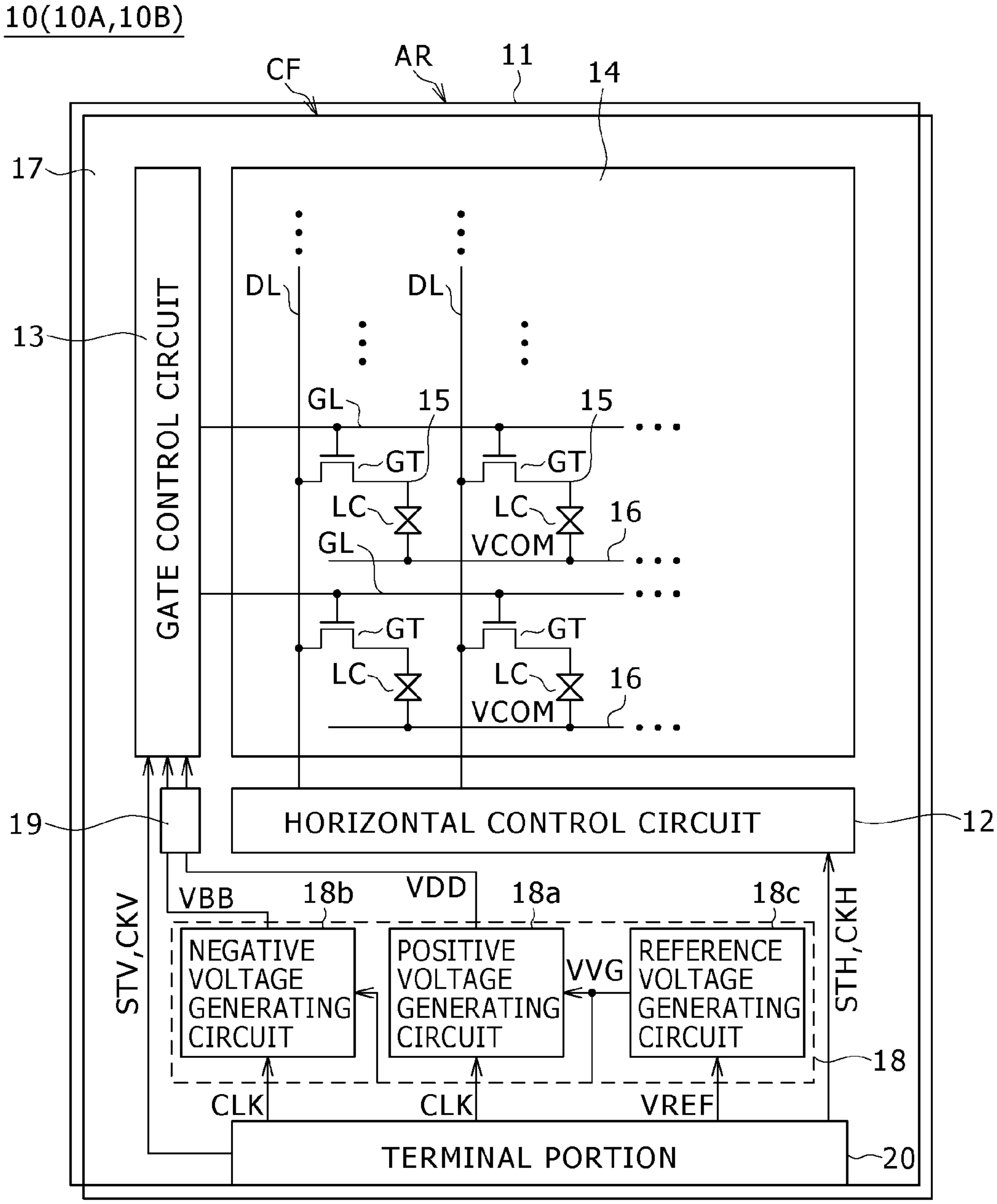
FIG. 1 is a block diagram, partly in circuit, showing a layout of a liquid crystal display device according to an embodiment mode of the present application common to liquid crystal display devices according to the first and second embodiments of the present application.

The present application is described below in detail with reference to the drawings according to an embodiment. The detailed description is provided as follows:

Firstly, a concrete configuration of a liquid crystal display device having an FFS mode according to an embodiment mode of the present application common to first and second embodiments of the present application will be described with reference to FIG. 1 to FIGS. 5A and 5B. In the liquid crystal display device 10, a horizontal drive circuit 12 and a gate control circuit 13 are formed on a glass substrate 11 on an array substrate AR side. Also, a plurality of pixels (four pixels are shown in FIG. 1) are disposed in a matrix in a pixel portion 14.

Figure 2:
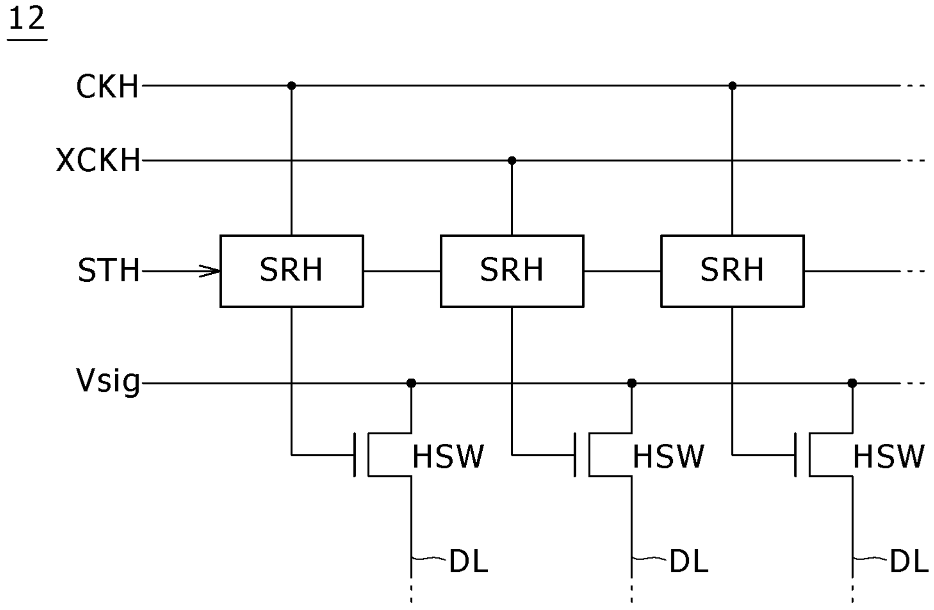
FIG. 2 is a circuit diagram showing a configuration of a horizontal control circuit used in the liquid crystal display device shown in FIG. 1.

As shown in FIG. 2, the horizontal drive circuit 12 includes a plurality of shift registers SRH and a plurality of horizontal switches HSW. In this case, a plurality of shift registers SRH successively transfer a horizontal start signal STH synchronously with a horizontal transfer clock CKH and an inverted clock XCKH of the horizontal transfer clock CKH. Also, a plurality of horizontal switches HSW are turned ON in accordance with output signals from the shift registers SRH. Each of the horizontal switches HSW is composed of a thin film transistor (TFT). The output signals from the shift registers SRH are applied to gate electrodes of the horizontal switches HSW, respectively, a video signal Vsig is applied to each of source electrodes of the horizontal switches HSW, and data lines (signal lines) DL are connected to drain electrodes of the horizontal switches HSW, respectively. That is to say, the horizontal switches HSW are turned ON in order in accordance with the output signals from the respective shift registers SRH to sample the video signal Vsig, thereby outputting the video signal Vsig thus sampled to the respective data lines DL.

Figure 3:
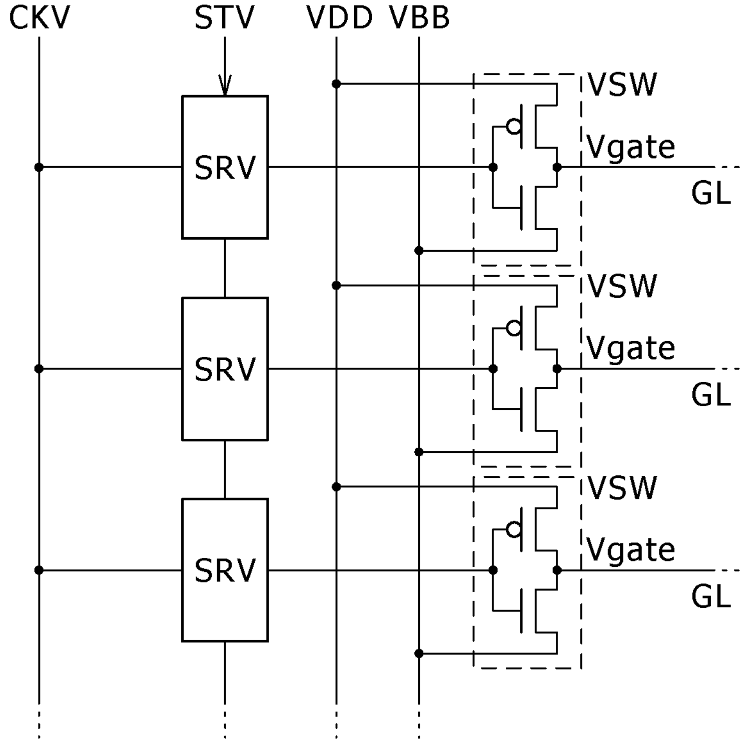
FIG. 3 is a circuit diagram showing a configuration of a gate control circuit used in the liquid crystal display device shown in FIG. 1.

As shown in FIG. 3, the gate control circuit 13 includes shift registers SRV and vertical switch circuits VSW. In this case, the shift registers SRV successively transfer a vertical start signal STV synchronously with a vertical transfer clock CKV. Also, the vertical switch circuits VSW supply gate signals Vgate to respective gate lines (scanning lines) GL in accordance with output signals from the respective shift registers SRV. Each of pixel transistors GT of the pixels is composed of a TFT. Source electrodes of the pixel transistors GT are connected to the respective data lines DL and gate electrodes of the pixel transistors GT are connected to the respective gate lines GL so that the pixel transistors GT are controlled so as to be turned ON or OFF in accordance with the respective gate signals Vgate. Also, drain electrodes of the pixel transistors GT are connected to respective pixel electrodes 15. Each of the gate signals Vgate is composed of a potential (selection potential) VDD in accordance with which corresponding one of the pixel transistors GT is turned ON, and a voltage (non-selection potential) VBB in accordance with which corresponding one of the pixel transistors GT is turned OFF. Also, the gate signals Vgate are switched and supplied by the vertical switching circuits VSW. The TFTs of the shift registers SRH, SRV, and the switch circuits HSW, VSW are formed in the same process as that for forming the pixel transistors GT, and a semiconductor layer of each of the TFTs, for example, is made of polysilicon.

In addition, in the liquid crystal display device 10, a common electrode 16 is formed so as to overlap the pixel electrodes 15 in terms of planar view through an inter-electrode insulating film (not shown). In one, which is formed on a surface (on a liquid crystal side) of the inter-electrode insulating film, of the pixel electrodes 15 and the common electrode 16, a plurality of slit-like openings are formed every pixel. In addition, a glass substrate 17 of a color filter substrate CF is provided so as to face a glass substrate 11 of the array substrate AR. Also, color filter layers (not shown) having various kinds of colors are provided on the glass substrate 17 so as to face the pixel electrodes 15, respectively.

In addition, a liquid crystal LC is enclosed between the glass substrate 11 of the array substrate AR and the glass substrate 17 of the color filter substrate CF. In the liquid crystal display device 10 having the FFS mode and having such a structure, the liquid crystal LC is driven by an approximately transverse potential applied across the pixel electrodes 15 and the common electrode 16 through the slit-like openings formed in one of the pixel electrodes 15 and the common electrode 16.

It is noted that for line inversion drive, a common electrode signal VCOM which is repetitively held at an H level and at an L level every one horizontal period of time is applied either from the outside of the liquid crystal display device 10 or from a driving IC provided on the glass substrate 11 of the array substrate AR of the liquid crystal display device to the common electrode 16. In the case where a pixel transistor GT is of an N-channel, when a gate signal becomes the H level, the pixel transistor GT is turned ON. As a result, the video signal Vsig is applied from the data line DL to the pixel electrode 15 through the pixel transistor GT to control the orientation of the liquid crystal LC, thereby carrying out the display. It is noted that in the case where the pixel transistor GT is of a P-channel, the P-channel pixel transistor GT is operated similarly to the case of the N-channel pixel transistor GT except that when the gate signal becomes the L level, the pixel transistor GT is turned ON. However, in the following, a description will be given with respect to the case where the pixel transistor GT is of the N-channel.

Since the common electrode signal VCOM is repetitively held at the H level and at the L level in the manner described above, the potential of the pixel electrode 15 is changed by capacitive coupling through the liquid crystal LC. Then, for the purpose of turning ON the pixel transistor GT, the H level of the gate signal is set as a boosted positive selection potential VDD. On the other hand, for the purpose of turning OFF the pixel transistor GT, the L level of the gate signal is set as a negative non-selection potential VBB. In order to create such a gate signal, a gate potential creating circuit 18 including a positive voltage generating circuit 18*a* for creating a boosted positive potential, and a negative voltage generating circuit 18*b* for creating a negative potential is formed in the driver IC. Also, a voltage control circuit 19 is connected between the gate potential creating circuit 18 and the gate control circuit 13. In this case, the voltage control circuit 19 switches an output potential from the gate control circuit 13 from a potential in a normal drive state over to a potential falling in a rise area after the power supply from the power source to the liquid crystal display device 10 is cut off. The voltage control circuit 19 is formed together with the gate control circuit 13 on the glass substrate 11 of the array substrate AR. It is noted that of a transistor, a resistor, a capacitor, and a diode composing the voltage control circuit 19, preferably, the capacitor and the diode each requiring a precision are not formed on the glass substrate 11 of the array substrate AR, but external elements are used as the capacitor and the diode, respectively.

Figure 4:
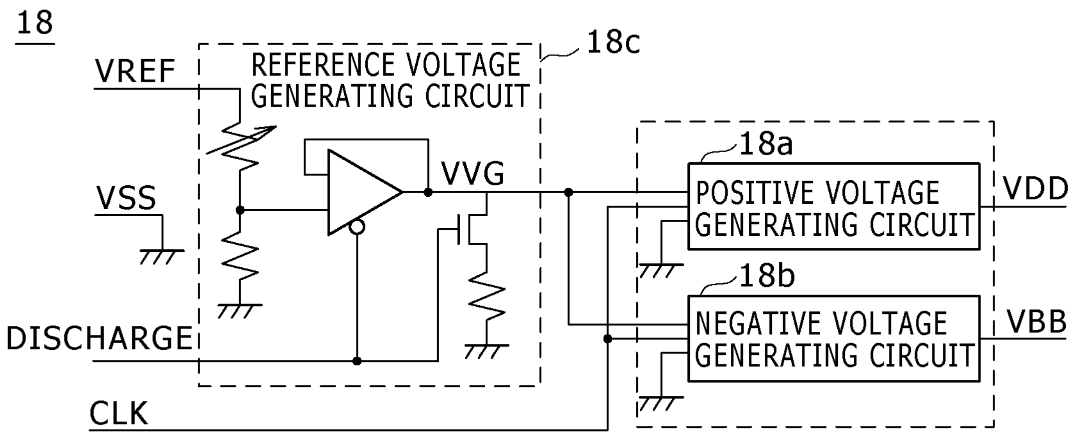
FIG. 4 is a schematic circuit diagram showing a configuration of a gate potential creating circuit used in the liquid crystal display device of the embodiment mode shown in FIG. 1.

As shown in FIG. 4, the gate potential creating circuit 18 includes a reference voltage creating circuit 18*c* for creating an input reference potential VVG for creation of a gate potential in accordance with a common reference voltage VREF. In this case, the reference voltage creating circuit 18*c* is formed within the liquid crystal display device 10. The positive voltage generating circuit 18*a*, for example, is composed of a double boosting circuit for boosting the input reference potential VVG by double, and generating the boosted positive selection potential VDD=2VVG. Also, the negative voltage generating circuit 18*b*, for example, is composed of a −1-fold boosting circuit for multiplying the input reference potential VVG by −1, and generating a non-selection potential VBB=−VVG.

Figure 5A:
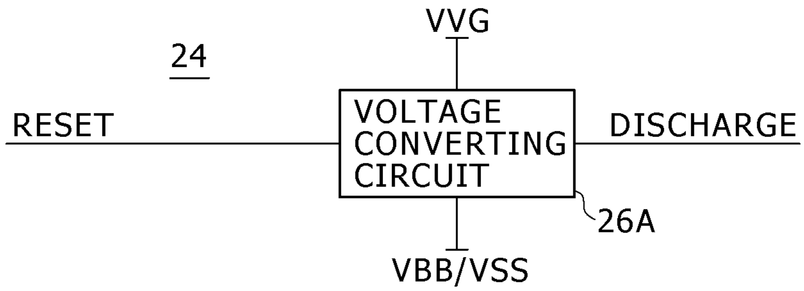
FIGS. 5A and 5B are respectively a block diagram showing a configuration of a power source cut-off signal generating circuit based on an external reset signal, and a block diagram, partly in circuit, showing a configuration of a power source cut-off signal generating circuit based on a reduction of a power source voltage.
Figure 5B:
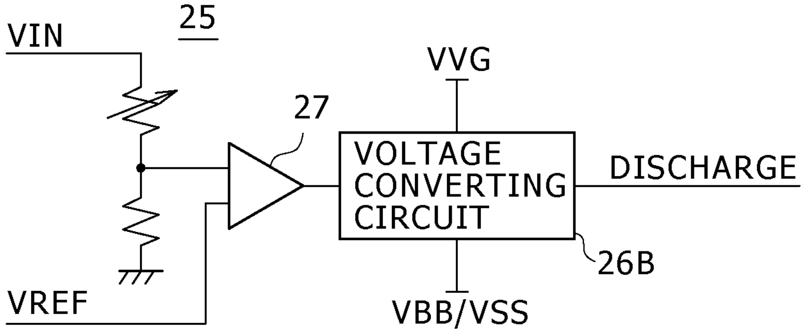

It is noted that as shown in FIG. 4, a power source cut-off signal DISCHARGE is supplied to the gate potential creating circuit 18, thereby resetting an operation of the reference voltage creating circuit 18*c*. The power source cut-off signal DISCHARGE, as shown in FIG. 5A or FIG. 5B, is generated either by a system reset circuit 24 or by a power supply voltage reduction detecting circuit 25. As shown in FIG. 5A, the system reset circuit 24 is a circuit for converting a system reset signal RESET inputted thereto from the outside into a signal either at an L level (VBB or VSS) or at an H level (VVG) by a voltage converting circuit 26A, thereby outputting the power source cut-off signal DISCHARGE.

In addition, as shown in FIG. 5B, the power supply voltage reduction detecting circuit 25 is a circuit for comparing a power source voltage VIN with a reference voltage VREF in a comparator 27 on a steady basis, and converting an output signal from the comparator 27 into a signal either at the L level (VBB or VSS) or at the H level (VVG) by a voltage converting circuit 26B, thereby outputting the power source cut-off signal DISCHARGE. In the liquid crystal display device 10 according to the embodiment mode of the present application, the abrupt power source cut-off state such as the battery coming-off is detected by the power supply voltage reduction detecting circuit 25. It should be noted that since the configurations of the voltage converting circuits 26A and 26B are well known, a detailed description thereof is omitted here for the sake of simplicity.

First Embodiment

Figure 6:
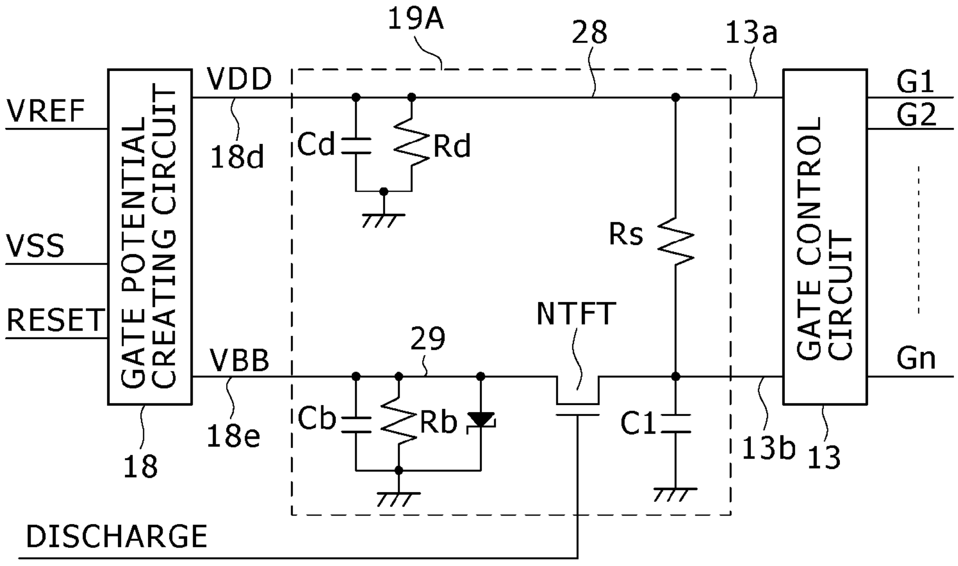
FIG. 6 is a circuit diagram, partly in block, showing a configuration of a voltage control circuit used in a liquid crystal display device according to a first embodiment.

Next, a concrete circuit configuration of a voltage control circuit 19A used in a liquid crystal display device 10A according to a first embodiment will be described with reference to FIG. 6. The selection potential VDD is supplied from a selection potential supply terminal 18*d* of the gate potential creating circuit 18 to the gate control circuit 13 through a selection potential supply line 28. Also, the non-selection potential VBB is supplied from a non-selection potential supply terminal 18*e* of the gate potential creating circuit 18 to the gate control circuit 13 through a non-selection potential supply line 29. In addition, the voltage control circuit 19A is disposed between the gate potential creating circuit 18 and the gate control circuit 13. In the voltage control circuit 19A, a selection potential stabilizing capacitor Cd and a selection potential discharge resistor Rd which double as smoothing of the selection potential VDD are connected in parallel between the selection potential supply terminal 18*d* of the gate potential creating circuit 18 and the ground potential VSS. In addition, a non-selection potential supply side stabilizing capacitor Cb and a non-selection potential discharge resistor Rb which double as the smoothing of the non-selection potential VBB are connected in parallel between the non-selection potential supply terminal 18*e* of the gate potential creating circuit 18 and the ground potential VSS.

In addition, a short-circuit resistor Rs as a short-circuit element is connected between the selection input terminal 13*a* and the non-selection potential input terminal 13*b* of the gate control circuit 13. A resistance value of the short-circuit resistor Rs should be suitably selected from a range in which in a phase of a normal operation, the potential at the selection input terminal 13*a* of the gate control circuit 13 can maintain the selection potential VDD and the potential at the non-selection potential input terminal 13*b* of the gate control circuit 13 can maintain the non-selection potential VBB, while in a phase of the power source cut-off, the potential at the selection input terminal 13*a* of the gate control circuit 13 becomes a voltage which is larger than the ground potential VSS and with which the thin film transistor TFT connected to the pixel electrode 15 can be maintained in a conduction state in accordance with a supply current value of the selection potential VDD of the gate potential creating circuit 18, and a supply current value of the non-selection potential VBB of the gate potential creating circuit 18. It is noted that although the short resistor Rs may be an external resistor, alternatively, the short resistor Rs may be made of polysilicon used in a semiconductor layer of the pixel transistor GT so as to be formed on the glass substrate 11 on the array substrate AR side.

Also, in the voltage control circuit 19A used in the liquid crystal display device 10A of the first embodiment, an N-channel thin film transistor NTFT (corresponding to a first switching element of the present application) is connected between the non-selection potential supply terminal 18*e* of the gate potential creating circuit 18, and the non-selection potential input terminal 13*b* of the gate control circuit 13. Also, the power source cut-off signal DISCHARGE is inputted to a gate electrode of the N-channel thin film transistor NTFT. Since the power source cut-off signal DISCHARGE becomes the H level (VVG) in the phase of the normal operation, the N-channel thin film transistor NTFT becomes a conduction state, while since the power source cut-off signal DISCHARGE becomes the L level (VBB or VSS) in the phase of the power source cut-off, the N-channel thin film transistor NTFT becomes an OFF state. In addition, in this case, a non-selection potential stabilizing capacitor C1 is connected between the non-selection potential input terminal 13*b* of the gate control circuit 13, and the ground potential.

In the phase of the normal operation, each of the selection potential stabilizing capacitor Cd and the non-selection potential supply side stabilizing capacitor Cb acts as the smoothing capacitor. Also, the presence of the selection potential discharge resistor Rd, the non-selection potential discharge resistor Rb and the short-circuit resistor Rs exerts no influence on each of the potential of the selection potential supply line 28 and the potential of the non-selection potential supply line 29. When the power supply from the power source is stopped due to the battery coming-off or the like, the power source cut-off signal DISCHARGE also becomes the L level (VBB or VSS) to become a reset state. The gate potential creating circuit 18 becomes a high impedance state when the signal at the L level (VSS=0 V) is inputted thereto as the power source cut-off signal DISCHARGE. Therefore, the supply of the electric charges to each of the selection potential supply line 28 and the non-selection potential supply line 29 is stopped. Since the N-channel thin film transistor NTFT is turned OFF concurrently with the stop of the supply of the electric charges, the electrical connection between the non-selection potential supply terminal 18*e* of the gate potential creating circuit 18, and the non-selection potential input terminal 13*b* of the gate control circuit 13 is cut off. At this time, the noises generated can be absorbed by the non-selection potential stabilizing capacitor C1.

According to the voltage control circuit 19A used in the liquid crystal display device 10A of the first embodiment, when the gate potential creating circuit 18 becomes the high impedance state, the short-circuit resistor Rs becomes valid, so that the N-channel thin film transistor NTFT is turned OFF. Therefore, the redistribution of the electric charges is carried out so as to obtain the potential corresponding to a ratio in capacitance between the selection potential stabilizing capacitor Cd and the non-selection potential stabilizing capacitor C1. For example, when VDD=10.0 V, VBB=−5.0 V, Cd=1.0 μF, Cb=1.0 μF, and C1=0.47 μF, (VDD−VBB)×(Cd/(Cd+C1))=10.0 V is obtained with the non-selection potential VBB as a reference. Therefore, a change is caused in the output signal in such a way that the potential at the non-selection potential input terminal 13*b* of the gate control circuit 13 becomes (VBB+10.0 V)=5.0 V. Here, FIG. 7 shows changes in potentials of the selection potential supply line 28, and the non-selection potential input terminal 13*b* of the gate control circuit 13 from a time point at which the power source cut-off state is caused when Rd=Rs=1 MΩ, and Rs=100 kΩ.

Figure 7:
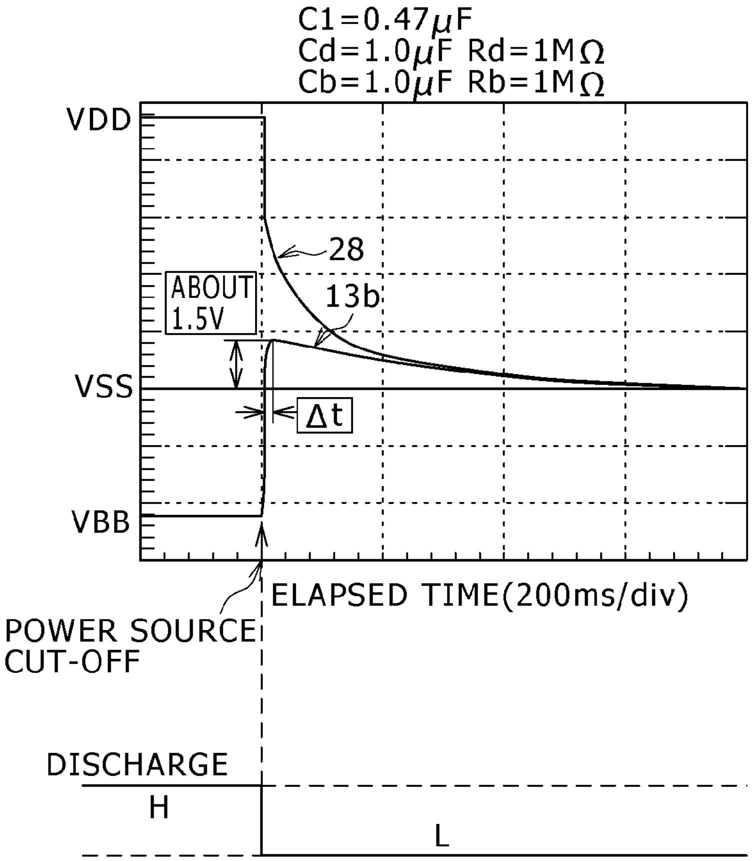
FIG. 7 is a graph showing changes in potentials of a selection potential supply line, and a non-selection potential input terminal of a gate control circuit from a time point of power source cut-off state in the voltage control circuit used in the liquid crystal display device according to the first embodiment.

When the power source cut-off state is caused, as shown in FIG. 7, the voltage of the selection potential supply line 28 is gradually reduced to the ground potential VSS (=0 V) due to a leakage current by the selection potential discharge resistor Rd. However, the potential at the non-selection potential input terminal 13*b* of the gate control circuit 13 rises close to about +1.5 V as a maximum potential after a lapse of about 150 msec, and is then gradually reduced to the ground potential VSS (=0 V). It should be noted that the reason that the potential at the non-selection potential input terminal 13*b* of the gate control circuit 13 does not reach the above calculated value of +5.0 V is because of the presence of the selection potential discharge resistor Rd and the short-circuit resistor Rs. In addition, in the liquid crystal display device 10A of the first embodiment, the selection potential VDD and the non-selection potential VBB are the maximum voltage and the minimum voltage within the glass substrate 11 of the array substrate AR, respectively. Therefore, an electrostatic protection diode is formed between the selection potential supply line 28 and the non-selection potential supply line 29, and a signal line through which the signal is inputted from the outside by the thin film transistor. Since an ON-potential (a threshold voltage of the thin film transistor) of a directional bias of this electrostatic protection diode is 1.5 V, the maximum potential at the non-selection potential input terminal 13*b* of the gate control circuit 13 after the power source cut-off becomes about 1.5 V. As described above, the potential of the non-selection potential supply line 29 has inverse V letter-like characteristics in which the potential of the non-selection potential supply line 29 temporarily rises up to the potential falling in the rise area after the power supply from the power source to the liquid crystal display device 10A is cut off, and then converges to the ground potential.

Figure 9:
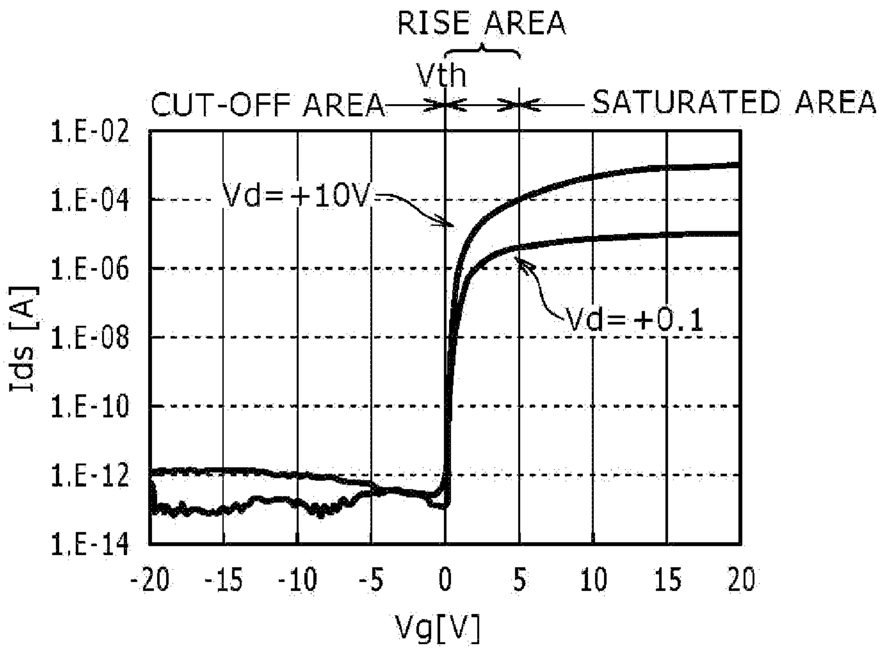
FIG. 9 PRIOR ART
FIG. 9 is a graph showing an example of electrical characteristics of a general LTPS-TFT.
Figure 10:
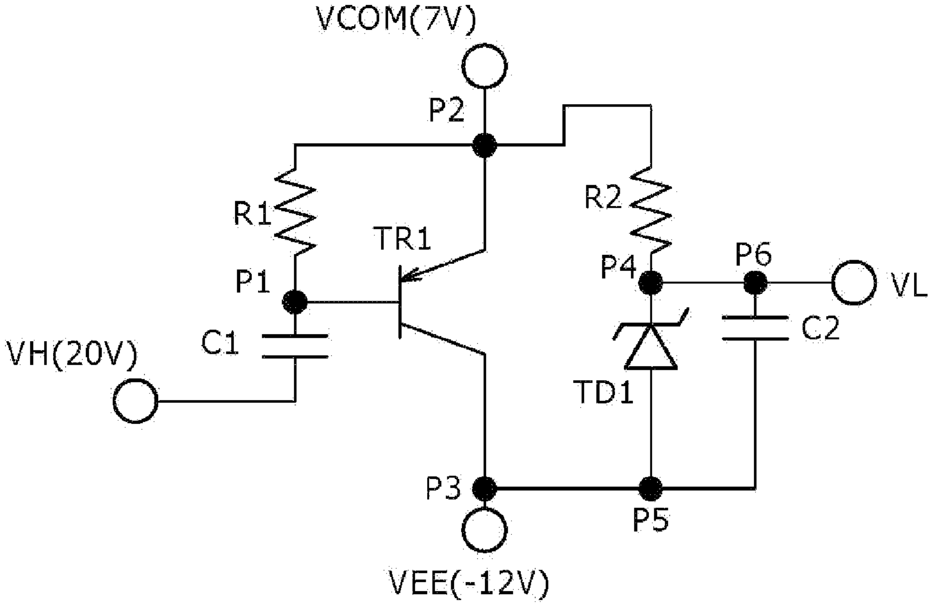
FIG. 10 PRIOR ART
FIG. 10 is a circuit diagram showing a configuration of a gate-OFF voltage control circuit of an existing liquid crystal display device.
Figure 11:
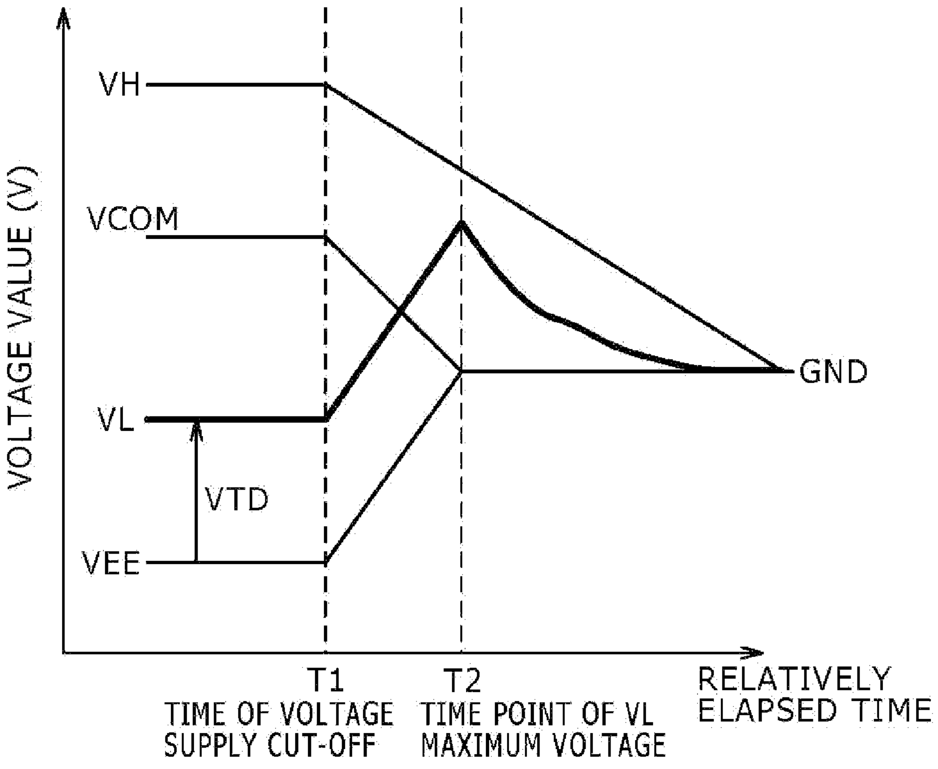
FIG. 11 PRIOR ART
FIG. 11 is a graphical representation showing a change in voltage in the gate-OFF voltage control circuit shown in FIG. 10.

With regard to output voltages to output terminals G1 to Gn (refer to FIG. 6) of the gate control circuit 13, in the phase of the normal operation, the non-selection potential VBB in accordance with which the pixel transistor GT is turned OFF is outputted in the phase of the non-selection state. Also, the selection potential VDD in accordance with which the pixel transistor GT is turned ON is applied in the phase of the selection state. When the power source cut-off state is caused, the potential applied to the pixel transistor GT held in the selection state is gradually reduced from the selection potential VDD to the ground potential VSS (=0 V). However, the electric charges charged between the pixel electrode 15 and the common electrode 16 (refer to FIG. 1) are perfectly discharged while the potential applied to the pixel transistor GT held in the selection state is reduced to the ground potential VSS (=0 V). In addition, the potential applied to the pixel transistor GT held in the non-selection state rises from the non-selection potential VBB to a potential close to about +1.5 V as the maximum potential after a lapse of about 150 msec, and is then gradually reduced to the ground potential VSS (=0 V). As apparent from the description given with reference to FIG. 9, even in the case of the LTPS-TFT, the potential of +1.5 V is sufficiently the potential falling within the rise area. Therefore, all the electric charges charged in the pixel electrode 15 can be substantially discharged. It is noted that the electric charges charged in the pixel electrode 15 are discharged through the data line DL the potential of which becomes 0 V at the same time that the power source cut-off is caused. In addition, for the purpose of suppressing the generation of the difference in potential between the pixel electrode 15 and the common electrode 16, the data line DL and the common electrode 16 may be connected to each other concurrently with the causing of the power source cut-off, thereby discharging the electric charges charged in the pixel electrode 15.

As has been described, according to the liquid crystal display device 10A of the first embodiment, even when the abrupt power source cut-off state such as the battery coming-off is caused, the pixel transistor GT, for driving the pixel electrode 15, which is connected to the gate control circuit 13 is maintained in the conduction state for a certain time. Therefore, since the electric charges remaining between the pixel electrode 15 and the common electrode 16 are discharged for a short period of time, the burn-in phenomenon, and the flicker after restart are difficult to cause. In addition, since the N-channel thin film transistor NTFT is reliably turned OFF for a short period of time in accordance with the power source cut-off signal DISCHARGE, the electric charges remaining between the pixel electrode 15 and the common electrode 16 can be reliably discharged for a short period of time.

As described above, when the power source cut-off state is caused, the supply of the electric charges from the gate potential creating circuit 18 to each of the selection potential supply line 28 and the non-selection potential supply line 29 is stopped. Therefore, the electric charges which are charged in the selection potential stabilizing capacitor Cd and the non-selection potential stabilizing capacitor C1 of the non-selection potential input terminal 13*b* of the gate control circuit 13, respectively, are redistributed by the short resistor Rs of the voltage control circuit 19 so as to obtain the potential corresponding to the ratio in capacitance between the selection potential stabilizing capacitor Cd and the non-selection potential stabilizing capacitor C1. In the liquid crystal display device 10A of the first embodiment, the voltage value obtained by the redistribution of the electric charges needs to fall within the rise area of the pixel transistor GT. For the purpose of reliably discharging the electric charges charged in the pixel electrode, the potential at the non-selection potential input terminal 13*b* of the gate control circuit 13 needs to become at least 1.0 V or more even in consideration of the dispersion of the characteristics of the pixel transistor GT. For this reason, preferably, the capacitance value of the selection potential stabilizing capacitor Cd of the gate potential creating circuit 18 is made equal to larger than the capacitance value of the non-selection potential stabilizing capacitor C1 of the non-selection potential input terminal 13*b* of the gate control circuit 13, that is, the following relationship is established:

$$Cd/C1 \geq 1$$

It is noted that although each of the optimal capacitance values of the selection potential stabilizing capacitor Cd, the non-selection potential supply side stabilizing capacitor Cb and the non-selection potential stabilizing capacitor C1 is changed even depending on the resistance value of the short-circuit resistor Rs, practically, it is equal to or larger than 0.47 μF and is equal to or smaller than 4 μF. The selection potential discharge resistor Rd and the non-selection potential discharge resistor Rb cause an increase in power consumption of the gate potential creating circuit 18 in the phase of the normal operation, and each of the resistance values of them is preferably equal to or larger than 500 kΩ and is equal to or smaller than 2 MΩ in consideration of a time constant when the selection potential stabilizing capacitor Cd and the non-selection potential supply side stabilizing capacitor Cb are combined with each other. In addition, when the easiness in design of the voltage control circuit 19 is taken into consideration, preferably, a relationship of Rd=Rb and Cd=Cb is established. In addition, even when the non-selection potential stabilizing capacitor C1 connected to the non-selection potential input terminal 13*b* of the gate control circuit 13 is omitted, the desired effects are offered. However, preferably, the non-selection potential stabilizing capacitor C1 is used because it is possible to suppress the bad influence by the noises due to the actuation of the N-channel thin film transistor NTFT when the power source cut-off is caused.

In addition, for the purpose of perfectly discharging the electric charges charged in the pixel electrode 15, the potential of the non-selection potential supply line 29 needs to be made to fall within the potential in the rise area of the pixel transistor GT while the difference in potential between the selection potential supply line 28 and the non-selection potential supply line 29 is held at the potential higher than the potential range in which the gate control circuit 13 can be operated. In order to attain this, it is better that the potential obtained by the redistribution of the selection potential VDD and the non-selection potential VBB based on the electric charges which are charged in the selection potential stabilizing capacitor Cd and the non-selection potential stabilizing capacitor C1 connected to the non-selection potential input terminal 13*b* of the gate control circuit 13, respectively, is made the potential falling in the rise area of the pixel transistor GT within about one second.

A speed of the redistribution of the selection potential VDD and the non-selection potential VBB can be increased by reducing the resistance value of the short-circuit resistor Rs. However, there is a limit to reduction of the resistance value of the short resistor Rs because the reduction of the resistance value of the short resistor Rs appears in the form of an increase in power consumption of the gate potential creating circuit 18 in the phase of the normal operation. For this reason, preferably, the resistance value of the short resistor Rs is equal to or larger than 50 kΩ and is equal to or smaller than 500 kΩ. When the resistance value of the short resistor is smaller than 50 kΩ, the power consumption of the gate potential creating circuit 18 becomes too large. In addition, when the resistance value of the short resistor exceeds 500 kΩ, it takes too much time until the voltage outputted from the gate control circuit 13 is switched over to the potential falling in the rise area. Thus, since the voltages applied to the respective circuits disappear for this period of time, it may be impossible to sufficiently discharge the electric charges remaining between the pixel electrode 15 and the common electrode 16.

Second Embodiment

Figure 8:
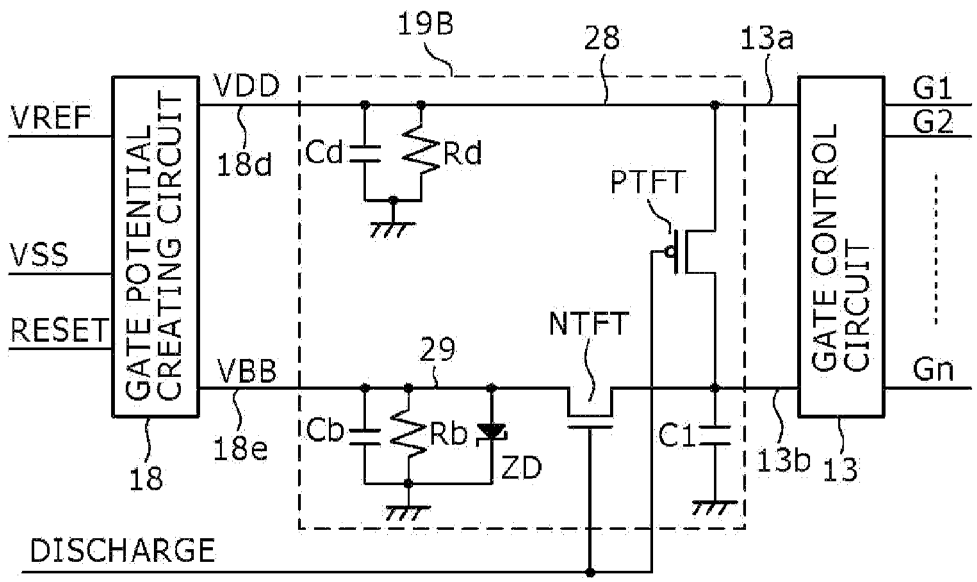
FIG. 8 is a circuit diagram, partly in block, showing a configuration of a voltage control circuit used in a liquid crystal display device according to a second embodiment.

Next, a concrete circuit configuration of a voltage control circuit 19B used in a liquid crystal display device 10B according to a second embodiment will be described with reference to FIG. 8. However, in the voltage control circuit 19B used in the liquid crystal display device 10B of the second embodiment, the same constituent elements as those in the voltage control circuit 19A used in the liquid crystal display device 10A of the first embodiment are designated by the same reference numerals, respectively, and a detailed description thereof is omitted here for the sake of simplicity.

The voltage control circuit 19B used in the liquid crystal display device 10B of the second embodiment is different from the voltage control circuit 19A used in the liquid crystal display device 10A of the first embodiment in that the short-circuit element connected between the selection potential supply line 28 and the non-selection potential input terminal 13*b* of the gate control circuit 13 is the short-circuit resistor Rs in the voltage control circuit 19A used in the liquid crystal display device 10A of the first embodiment, whereas that short-circuit element is a P-channel thin film transistor PTFT (corresponding to a second switching element of the present application) in the voltage control circuit 19B used in the liquid crystal display device 10B of the second embodiment. More specifically, a drain electrode and a source electrode of the P-channel thin film transistor PTFT are connected to the selection potential supply line 28 and the non-selection potential input terminal 13*b* of the gate control circuit 13, respectively, and the power source cut-off signal DISCHARGE is supplied to a gate electrode of the P-channel thin film transistor PTFT.

The P-channel thin film transistor PTFT as the short-circuit element is turned ON when the voltage applied to the gate electrode thereof becomes the L level, and is turned OFF when the voltage applied to the gate electrode thereof becomes the H level. In addition, the power source cut-off signal adopted in the liquid crystal display device 10B of the second embodiment is a signal which is held at the H level in the phase of the normal operation, and is held at the L level in the phase of the power source cut-off similarly to the case of the first embodiment. Therefore, the P-channel thin film transistor PTFT is held in the ON state in the phase of the power source cut-off, thereby making it possible to short-circuit between the selection potential supply line 28 and the non-selection potential input terminal 13*b* of the gate control circuit 13. In addition, an ON-resistance of the P-channel thin film transistor PTFT is small, and an operating speed of the P-channel thin film transistor PTFT is high. Therefore, the potential at the non-selection potential input terminal 13*b* of the gate control circuit 13 can be reliably made to fall within the potential in the rise area of the pixel transistor GT for driving the pixel electrode for a short period of time. Thus, it is possible to reliably discharge the electric charges remaining between the pixel electrode 15 and the common electrode 16. As a result, it is possible to provide the liquid crystal display device in which the burn-in phenomenon, and the flicker in the phase of the restart are hardly caused in spite of the simple configuration which can be inexpensively manufactured.

It is noted that although in each of the liquid crystal display devices 10A and 10B of the first and second embodiments, the case of the N-channel LTPS-TFT has been exemplified, the case where a P-channel LTPS-TFT is used in the terms of the semiconductor layer can be adopted as it is when the polarity of the voltage or potential is taken into consideration. In addition, although in each of the liquid crystal display devices 10A and 10B of the first and second embodiments, the case where polysilicon is used in the semiconductor layer has been described, the present invention can be similarly applied to the case where amorphous silicon is used in the semiconductor layer.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display device comprising a first substrate and a second substrate disposed to face each other so as to hold a liquid crystal layer between said first substrate and said second substrate, and a gate potential creating circuit for outputting a selection potential and a non-selection potential, scanning lines, signal lines, thin film transistors formed so as to correspond to intersection portions between said scanning lines and said signal lines, respectively, pixel electrodes electrically connected to said thin film transistors, respectively, and a gate control circuit for switching the selection potential and the non-selection potential supplied from said gate potential creating circuit over to each other, thereby supplying one of the selection potential and the non-selection potential to corresponding ones of said thin film transistors through corresponding one of said scanning lines being formed on said first substrate, and a common electrode being formed either on said first substrate or said second substrate, wherein a voltage control circuit for changing the non-selection potential to a potential in a rise area of said thin film transistor in accordance with a power source cut-off signal is connected between said gate potential creating circuit and said gate control circuit, said voltage control circuit includes a diode connected between a supply terminal for the non-selection potential of said gate potential creating circuit and a ground potential, a first switching element connected between said supply terminal for the non-selection potential of said gate potential creating circuit and an input terminal for the non-selection potential of said gate control circuit, and a short-circuit element connected between an input terminal for the selection potential and said input terminal for the non-selection potential of said gate control circuit, said first switching element cuts off between said supply terminal for the non-selection potential of said gate potential creating circuit and said input terminal for the non-selection potential of said gate control circuit in accordance with the power source cut-off signal, and said short-circuit element substantially short-circuits between said input terminal for the selection potential and said input terminal for the non-selection potential of said gate control circuit in accordance with the power source cut-off signal.

2. The liquid crystal display device according to claim 1, wherein the power source cut-off signal is a signal which is held at an H level in a phase of a normal operation, and is held at an L level in a phase of a power source cut-off, and said first switching element is composed of an N-channel thin film transistor.

3. The liquid crystal display device according to claim 1, wherein stabilizing capacitors are connected between said supply terminal for the selection potential of said gate potential creating circuit and the ground potential, and between said supply terminal for the non-selection potential of said gate potential creating circuit and the ground potential, respectively.

4. The liquid crystal display device according to claim 3, wherein discharge resistors are connected in parallel with said stabilizing capacitors, respectively, and resistance values of said discharge resistors are identical to each other.

5. The liquid crystal display device according to claim 4, wherein a following relationship is established:

$$Cd \geq C1$$

where Cd is a capacitance value of said stabilizing capacitor connected to said supply terminal for the selection potential of said gate potential creating circuit, and C1 is a capacitance value of said non-selection potential stabilizing capacitor.

6. The liquid crystal display device according to claim 3, wherein a non-selection potential stabilizing capacitor is connected between said input terminal for the non-selection potential of said gate control circuit, and the ground potential.

7. The liquid crystal display device according to claim 1, wherein said short-circuit element is composed of a resistor connected between said input terminal for the selection potential and said input terminal for the non-selection potential of said gate control circuit.

8. The liquid crystal display device according to claim 7, wherein a resistance value of said resistor is equal to or larger than 50 kΩ, and is equal to or smaller than 500 kΩ.

9. The liquid crystal display device according to claim 7, wherein said resistor is formed from the same film as that of a semiconductor layer of said thin film transistor.

10. The liquid crystal display device according to claim 1, wherein said short-circuit element is composed of a second switching element connected between said input terminal for the selection potential, and said input terminal for the non-selection potential of said gate control circuit, and said second switching element is adapted to be turned ON in accordance with the power source cut-off signal.

11. The liquid crystal display device according to claim 10, wherein the power source cut-off signal is a signal which is held at an H level in a phase of a normal operation, and is held at an L level in a phase of a power source cut-off, and said second switching element is composed of a P-channel thin film transistor.

12. The liquid crystal display device according to claim 1, wherein a potential of an input signal from said gate control circuit has inverse V letter-like characteristics in which the potential of the input signal from said gate control circuit temporarily rises up to the potential falling in the rise area after generation of the power source cut-off signal, and then converges to the ground potential.

13. The liquid crystal display device according to claim 1, wherein a period of time required for the potential of the input signal from said gate control circuit to reach the potential falling in the rise area is set as being equal to or shorter than one second.

14. The liquid crystal display device according to claim 1, wherein each of said gate potential creating circuit and said gate control circuit is formed in an outer peripheral portion of a display area of said first substrate, and a semiconductor layer includes a transistor made of polysilicon.

* * * * *